United States Patent

Glenn

[11] Patent Number: 5,811,705
[45] Date of Patent: Sep. 22, 1998

[54] LEARNING APPARATUS

[76] Inventor: Catharine Helena Glenn, Unterschrift des Erfinders, 79400 Kandern, Germany

[21] Appl. No.: 491,852

[22] PCT Filed: Dec. 20, 1993

[86] PCT No.: PCT/DE93/01222

§ 371 Date: Aug. 23, 1995

§ 102(e) Date: Aug. 23, 1995

[87] PCT Pub. No.: WO94/15324

PCT Pub. Date: Jul. 7, 1994

[30] Foreign Application Priority Data

Dec. 23, 1992 [DE] Germany ............................ 9217603 U
Apr. 8, 1993 [DE] Germany ............................ 9305376 U

[51] Int. Cl.⁶ ................................................ G09B 15/02
[52] U.S. Cl. ...................................... 84/477 R; 84/471 R
[58] Field of Search .............................. 84/471 R, 477 R, 84/483.1, 470 R

[56] References Cited

U.S. PATENT DOCUMENTS

| 1,803,630 | 5/1931 | Lossie . | |
|---|---|---|---|
| 2,063,501 | 12/1936 | Harbo | 84/471 R |
| 2,807,183 | 9/1957 | Ney | 84/471 R |
| 3,817,145 | 6/1974 | Cohen | 84/471 |
| 4,108,042 | 8/1978 | Blau | 84/471 R |
| 4,464,971 | 8/1984 | Dean | 84/471 R |

FOREIGN PATENT DOCUMENTS

| 2105596 | 4/1972 | France . |
|---|---|---|
| 1001512 | 8/1957 | Germany . |
| 1294075 | 4/1969 | Germany . |
| 2400386 | 7/1975 | Germany . |
| 2651019 | 5/1978 | Germany . |
| 8228196 | 8/1983 | Germany . |
| 3601571 | 7/1986 | Germany . |
| 8706902 | 11/1987 | Germany . |
| 2517224 | 11/1988 | Germany . |
| 9202984 | 9/1992 | Germany . |
| 9305376 | 7/1993 | Germany . |
| 117562 | 7/1918 | United Kingdom . |
| 2046980 | 11/1980 | United Kingdom . |

*Primary Examiner*—Cassandra C. Spyrou
*Attorney, Agent, or Firm*—Henry M. Feiereisen

[57] ABSTRACT

A learning apparatus for learning notes includes a planar, one-part or multi-part board, made of wood, cardboard, plastic, or a similar, nearly form-rigid material with a working surface, exhibiting non-removable and well-recognizable staff indicia means. The work surface is inscribable or imprintable and covered with an adhering felt layer or magnetic foil or with a foil furnished with comparable adhering means, wherein light form-parts, which are easily removable by hand, are placeable on the foil. The form-parts are shaped like all musical notation indicia and musical clef indicia used for writing down notes and are furnished at their backs with hook-and-loop adhering means or magnetic adhering means or the like adhering means. The musical notation indicia are made of metal, plastic, wood, caoutchouc or a similar, nearly form-rigid or slightly plastically deformable material provided with a color coating on their surface or are made of materials having different colors.

11 Claims, 8 Drawing Sheets

LEARNING APPARATUS

The invention relates to a learning apparatus for the learning of notes with a planar two-part or multi-part foldable board from a substantially rigid material with a work surface that can be written or printed on and that is covered with an adhesive felt layer or with a magnetic foil or with a layer furnished with comparable adhering means, where the work surface exhibits easily recognizable, non-removable staff indicia comprising staff lines, wherein the learning apparatus exhibits light-weight shaped forms, furnished on their backs with hook-and-loop or magnetic or the like adhering means, in the shape of all musical notation indicia and musical clef indicia used for writing down notes, which shaped forms are attachable and easily placed and removed again by hand on the foil of the work surface, wherein the notation indicia are made of a substantially rigid or readily plastically deformable caoutchouc rubber and are covered with a colored coating at their surface or are made of materials of different colors.

Such a learning apparatus is known from the U.S. Pat. No. 4,464,971, which is made of a one-part or a multi-part board, and in the latter case of a foldable board. Staff indicia means comprised of staff lines in an enlarged scale are applied in a removable manner onto the work surface of the apparatus by way of adhering agents, where again form-parts in the shape of sign and symbols of the musical notation indicia and other musical clef indicia can be removably placed also with adhering means, preferably loop-and-hook connections, and can be composed anew again and again. Moreover, additional auxiliary means can be applied, such as several overlayed transparent foils, where signs and symbols of the notation indicia are applied individually or in groups on the foils. Such a set of foils can be attached in the upper region of the board and the foils can then be placed individually or as a plurality from a folded-over position over to the work surface, such that the signs disposed thereon and in line with the staff indicia meaningfully complement each other and/or with the attachable form-parts. This known apparatus is however limited in its usability. In particular, the individual foils of the set of foils, which are actually intended to serve as a kind of guide-line by the teacher to those learning, can easily side and have to be folded or be completely removed as a set in case the board is to be folded together and to be transported, for example, in a schoolbag or to another location.

Thus, the purpose of the invention relates to a per se known learning apparatus to furnish this learning apparatus with additional technical elements thereby completing it in order to create a broader and more universal palette of utilization possibilities. In particular, at least one part of the musical notation indicia and musical clef indicia is to be maintained unchanged in its position during the transport of the learning apparatus in a folded state.

This is achieved according to the invention by having the learning apparatus exhibit printing blocks or stamps reproducing additional musical notation indicia and musical clef indicia with in each case a support handle and with a marking plate, connected to this handle, capable of absorbing the coloring agent, exhibiting marking lines, and made of rubber and, in addition, a notation table having an essentially rectangular shape and made of a rigid or plastically deformable material or also of a transparent material, where the notation indicia are indicated in their position in the staff indicia with their name designation and the associated clef; in addition, the learning apparatus, exhibits cover plates for the partial covering of the work surface, where the cover plates exhibit at least one cut-out which is just large enough to free individual musical notes or several musical notes for viewing. The learning apparatus exhibits in the folded state of the board a format which can be placed into a schoolbag or carrying case.

The apparatus is suitable to practice playfully the reading of notes and the learning of notes in particular for children from about the age of 4 years on. The learning child can first visually "experience" always anew and remember given or also self-composed notes, intervals, tone sequences and motives, and finally, building on a base motif given by the teacher, vary and change. With the aid of the printing blocks or stamps, musical notation indicia or musical clef indicia can be pressed onto the work surface with a coloring agent, which indeed adheres but can be wiped off again, wherein the possibility exists, to provide for example different colors for different note values and associated rest symbols and to support in this manner the learning process. The symbols printed as guidelines with the printing blocks or stamps cannot be erased or changed by accident and cannot be displaced even during the transport of the board in a bag or case, and thus they are available for further situations until they are intentionally erased or changed.

The recited notation tables exhibit preferably an edge reinforcement on two sides or all sides and are furnished with a reciprocally coacting attachment means for the production of force-matching attachment connection on the work surface. The notation tables are particularly suited to allow the learning person to find easily the names of the notes. The positions in the staff indicia means, where the notation indicia have to be attached for a specific tone sequence, are easily recognizable and readable for all (current) instruments and, if it is desired, also in foreign languages. In this connection the notation tables can also be made of two parts if they are attached on both sides at the board; they can be connected like a hinge or they can be slidable on top of each other or into each other like a telescope by means of guide elements.

The thin-walled form-parts, exhibiting an adhering agent on its back aide, can be furnished with an easily removable protective foil in order to avoid damage.

According to a further embodiment of the invention, in addition to the notation tables, also notation foils, furnished with staff indicia and having a smaller format than the board and comprised of a transparent, nearly rigid or easily plastically deformable material, can be placed onto the board with the fixed staff indicia in a shifted manner in different height levels and width levels relative to the latter. Thus, it is possible to shift rhythms, chords, intervals or other tone and melody sequences given on the notation foils in the staff indicia means, wherein also the prefixed can be placed differently and changed again. In this way, transposing can also be exercised. The staff indicia means on the foils and on the work surface are kept at the same scale for this purpose.

The staff indicia means, furnished on the board on one side or two sides and contrasting in color relative to the surface and the colors of the form-parts, are advantageously furnished with enlarged spaces between the staff lines from 12 to 20 mm relative to the standard dimensions. This makes the handling of the apparatus easier, particularly for smaller children.

In addition, the staff means, disposed on the work surface, can be complemented by superposing a foil with lines running perpendicular to the existing staff lines, such that, for example, already present tone sequences and rhythms can be varied and completed.

Advantageously, the form-parts and/or the musical notation indicia and musical clef indicia reproducing rubber stamps are placed in an apparatus box with compartments for storing and for removal. The form-parts and/or the printing blocks or, respectively, rubber stamps can be placed in an orderly manner according to color and/or value in the individual compartments such that they can be quickly found again for further use.

In comparison to the already known aids for learning, the apparatus according to the invention is broadly developable and applicable and it can be easily carried despite its large format. It can therefore also be easily employed in external instruction rooms, for example in kindergartens or similar institutions, during music instructions and for practicing at home.

Further features and particularities of the invention are described in the following and explained in more detail by way of the embodiments shown in the drawing:

There is shown in:

FIG. 2b is the learning apparatus according to FIG. 1, illustrating the application of a covering plate to allow focus on two musical notations, FIG. 3 examples of musical notation tables in several differently selected forms and in fact FIG. 3a for piano in German FIG. 3b for piano in English FIG. 3c for a melody instrument in German FIG. 3d for viola in German FIG. 3e for a melody instrument in Italian FIG. 3f for a bass instrument in German, FIG. 4 a nontransparent or transparent inscribable foil with two staff indicia means, FIG. 5 a transparent foil with the musical symbols of a melody, for the placing onto the foil according to FIG. 4, FIG. 6 a nontransparent or transparent inscribable foil with two staff indicia means, FIG. 7 transparent foils with A, B, C, D different intervals, E, F, G, H—different chords, I, K—different rhythms, FIG. 8 transparent foils with 8A and 8B different rhythms, 8C to 8F different sharp key signatures, 8G to 8J different flat key signatures, FIG. 9 illustration of an apparatus box with individual compartments, FIG. 10 rubber stamp with handle, FIG. 11 a top perspective representation of an indicia printing stamp with handle and a form-part configured in a shape of a musical notation.

Figure 1:
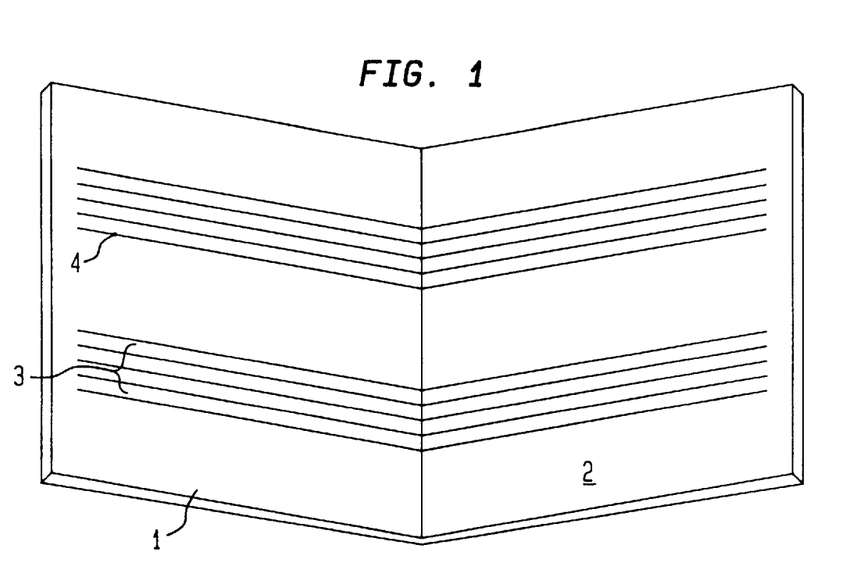
FIG. 1 the learning apparatus in the shape of a two-part, unfolded board with two staff indicia means applied to the work surface, FIG. 2 the learning apparatus according to FIG. 1 with various musical symbols and musical notes disposed in the staff indicia means.

The two-part foldable board 1 of the learning apparatus is illustrated in FIG. 1, where the board 1 is made of a material having a substantial bending strength or at least not readily deformable, such as wood, cardboard, plastic, or the like. Two staff indicia means 3 with their staff lines 4 are applied fixedly and easily recognizable on the work surface 2 of the board 1. It is to be noted that these lines 4 show a good contrast relative to the work surface 2. Preferably, the contrast colors are the colors black or green for the work surface 2 and the colors white or yellow for the staff lines 4; however, also other color contrasts can be useful.

Figure 2:
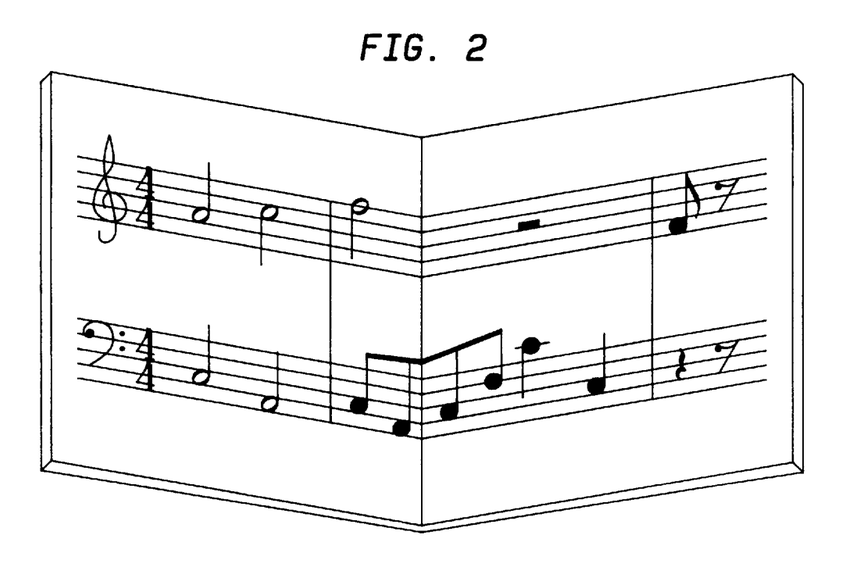

The work surface 2 of the board 1 is furnished with an adhering, magnetic foil or, respectively, with a felt covering or hook-and-loop covering. The adhering felt layer or magnetic foil or felt covering or hook-and-loop covering or a foil furnished with comparable adhering means covering the working surface is designated as adhering layer. According to FIG. 2, the form-parts, exhibiting on their back side adhering materials cooperating and coacting with the covering of the work surface 2, can represent notations as well as all remaining musical symbols, and the form-parts FK can in-this way be applied sufficiently adhering and also again removable on the work surface 2 of the board 1. Suitably, the back side of the form-part FK may include a removable protective foil.

The form-parts can be low weight form-parts, furnished at their back with hook-and-loop adhering means or magnetic adhering means or the like adhering means, which are designated in the present invention as adhering means.

Figure 2A:
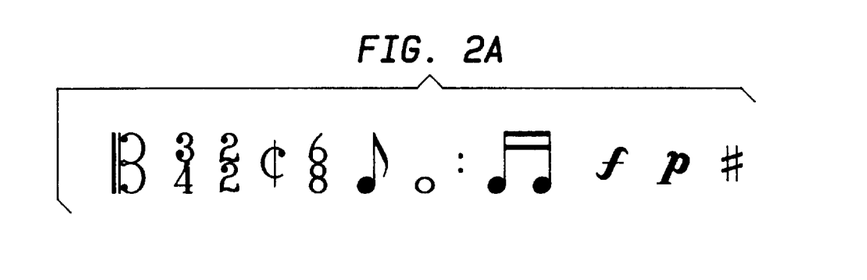
FIG. 2a is an exemplified illustration of a reproduction of several musical notations.
Figure 2B:
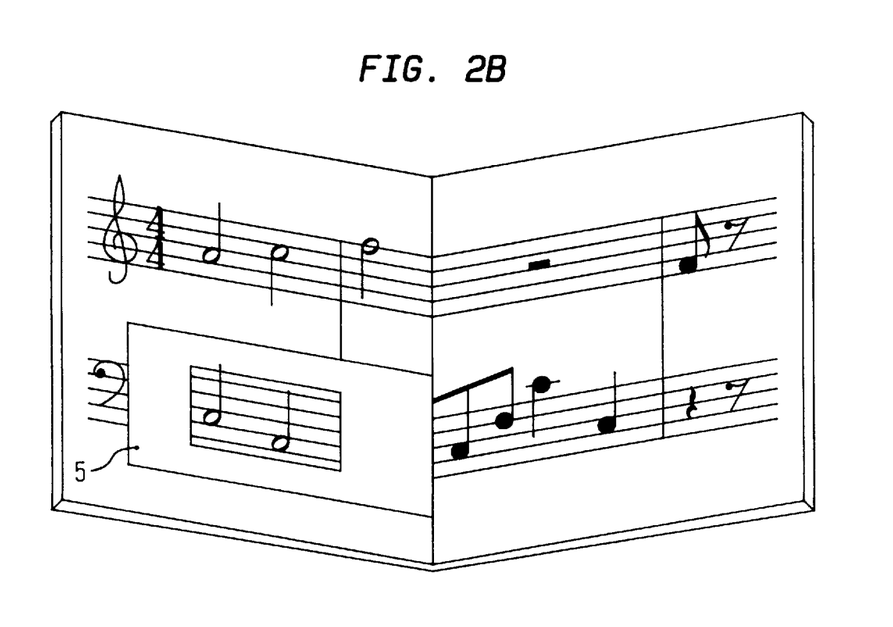
Figure 3A:
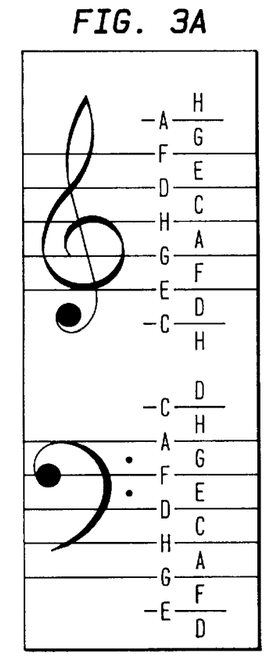
Figure 3B:
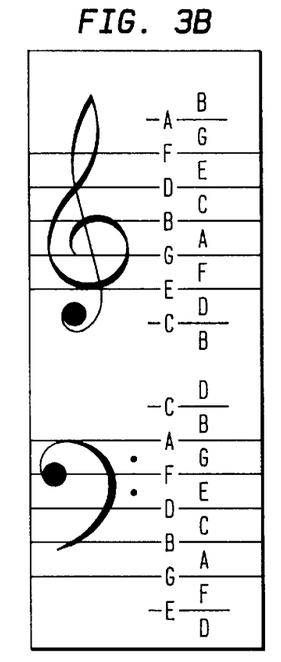
Figure 3C:
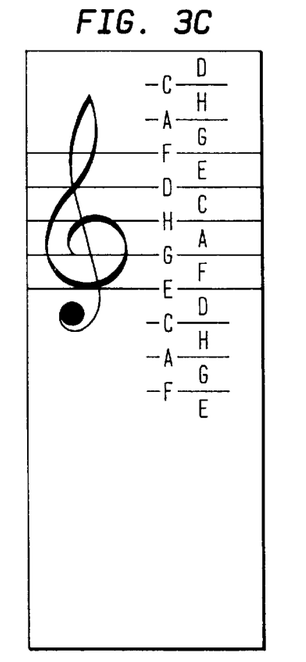
Figure 3D:
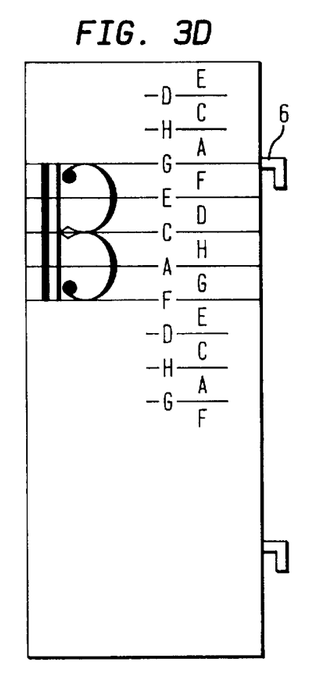
Figure 3E:
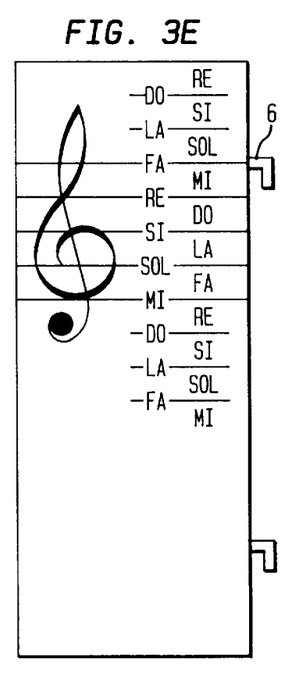
Figure 3F:
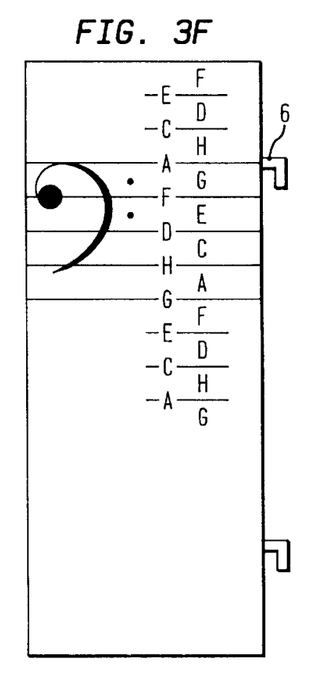

An exemplified selection of musical symbols illustrated in FIG. 2a can be made of metal, plastic, wood, caoutchouc rubber or another material, which is dimensionally stable but which can also be plastically deformable to some extent. In this case, the musical symbols, formed as form-parts, can be formed both as complete musical notes as well as individual, compoundable elements of notes; e.g. note heads, note stems, note flags as well as note bars for connecting of note stems, and others. In order to allow visual recognition of one or more musical notations, a covering plate 5 is provided by which the work surface can be, at least partially, masked and which is formed with at least one cutout of a size that is large enough to expose the musical notation or notations, as shown in FIG. 2b.

The staff indicia means 3 and the therewith associated musical symbols are advantageously kept in a larger scale than the scale usually present on music paper. The scale is selected such that a short melody can be placed completely on the staff indicia means 3 present on the board 1. A distance of from about 12 mm to 20 mm between the staff lines 4—depending on the size of the board 1—has proven to be advantageous.

The musical notation indicia are comprised of a form-rigid or easily plastically deformable caoutchouc rubber called in the context of this application indicia caoutchouc rubber and are color-coated on their surface or made of materials of different colors designated in the context of this application as colored notation indicia. Suitably, in order to display a good contrast relative to the work surface 2 and the staff lines 4, the form-parts FK apply musical notations of a color that is different from the colors of the work surface 2 and the staff lines 4.

As can be recognized by way of example from FIG. 3, the notation tables 3a to 3f can be prepared for the different instruments and for the use of persons speaking different languages. These notation tables can be made of a rigid or plastically deformable material or also of a transparent work material. As further indicated in FIG. 3, the notation tables 3a–f may be reinforced along the edges on opposite sides or all-round for improved handling.

In other words, the notation tables are made of a rigid or plastically deformable material or also or transparent material designated in the context of the present invention as notation table material.

In addition, they can also be furnished in different colors. They are particularly suited to find easily the names of the notes. For this purpose, the staff lines or, respectively, the staff indicia means 3 are kept in the same scale as the staff indicia means on the work surface 2; therefore, the transparent notation tables can be placed onto the work surface and can be shifted within the staff indicia means. It is also possible to apply the notation tables on one side or on two sides on the board 1 or to attach the notation tables by means of attachment means, for example hooks as indicated in FIGS. 3a–f by reference numeral 6 and complementary eyes (not shown), or also to slide the notation tables laterally in guides.

Figure 4:
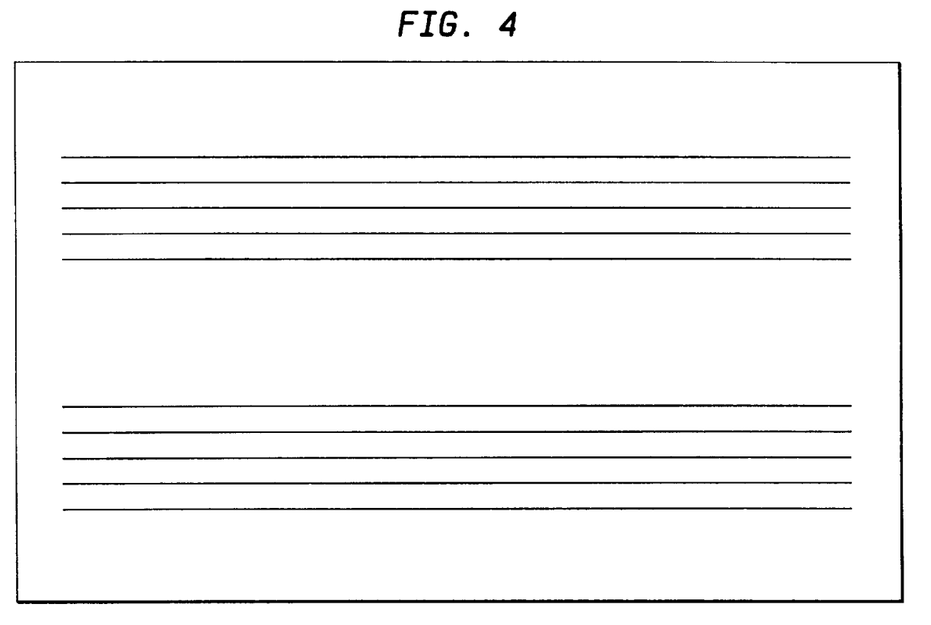
Figure 5:
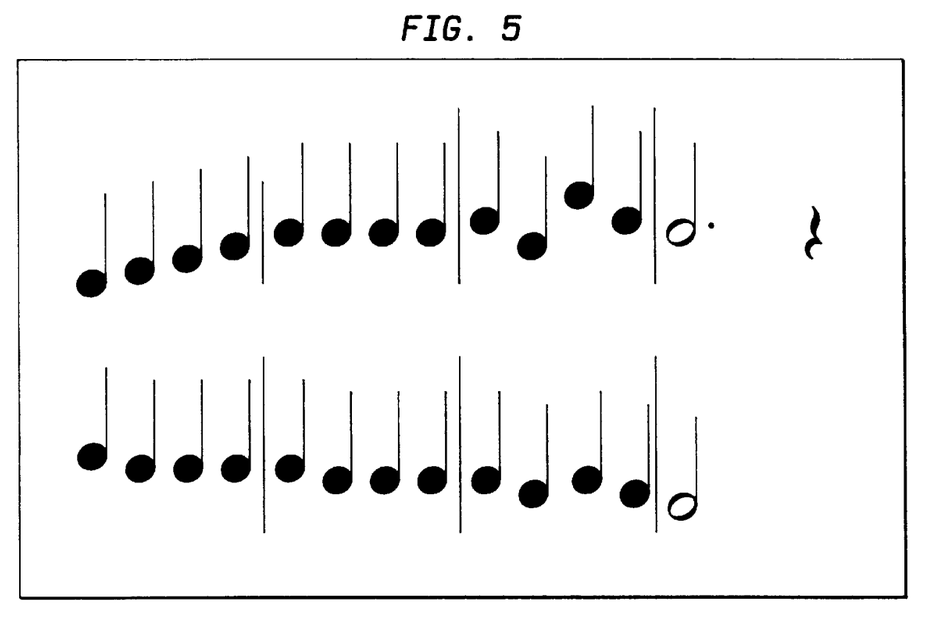
Figure 6:
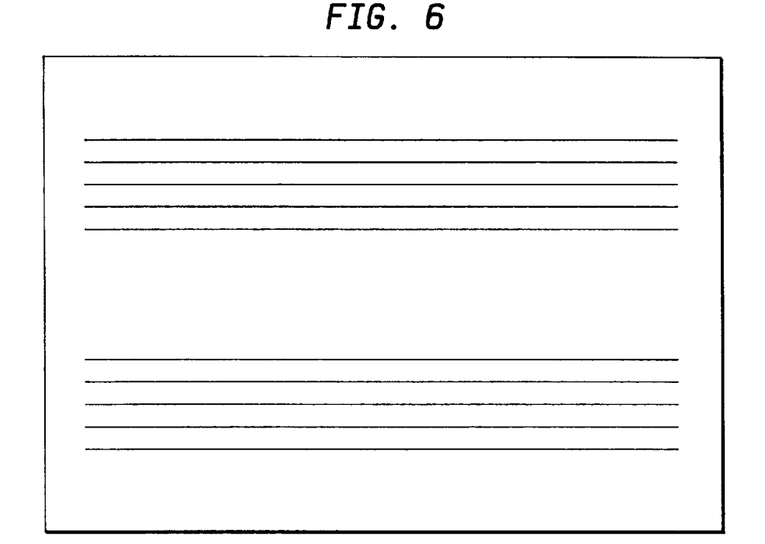
Figure 7A:
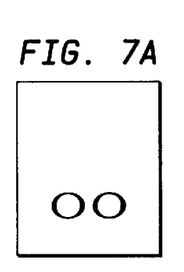
Figure 7B:
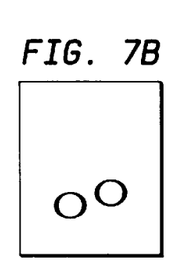
Figure 7C:
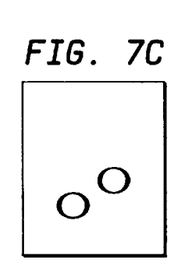
Figure 7D:
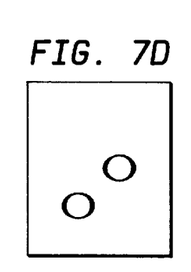
Figure 7E:
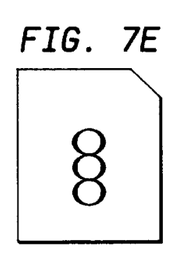
Figure 7F:
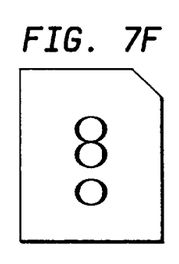
Figure 7G:
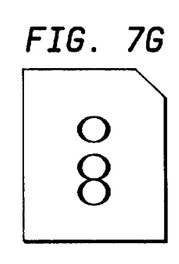
Figure 7H:
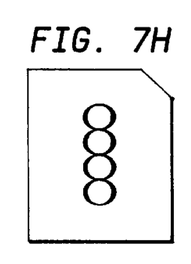
Figure 7I:
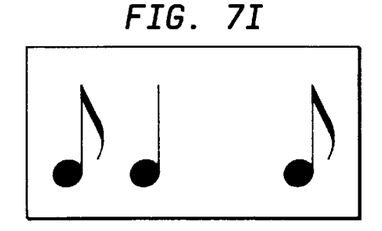
Figure 7J:
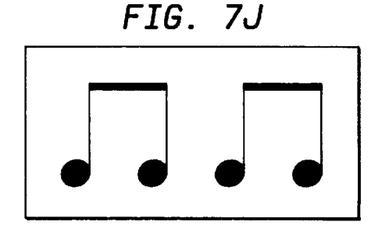
Figure 8A:
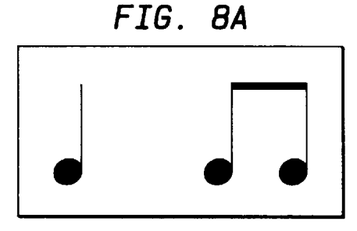
Figure 8B:
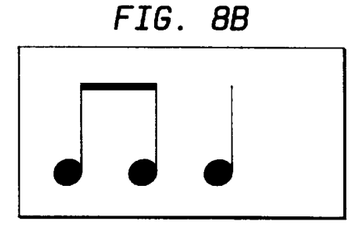
Figure 8C:
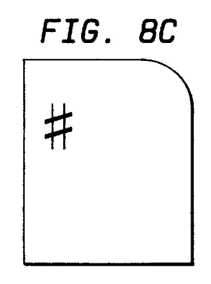
Figure 8D:
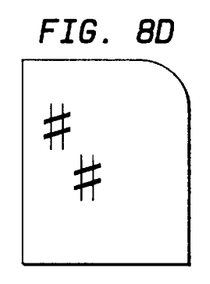
Figure 8E:
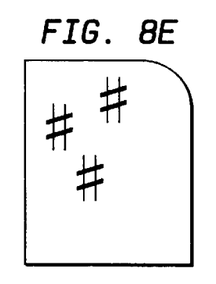
Figure 8F:
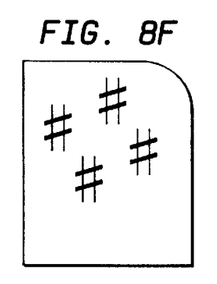
Figure 8G:
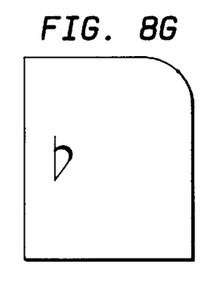
Figure 8H:
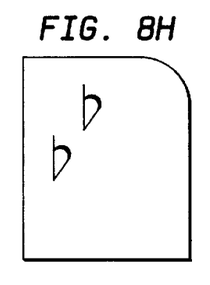
Figure 8I:
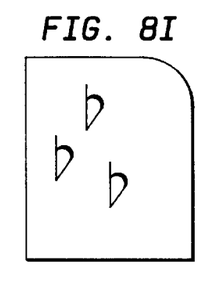
Figure 8J:
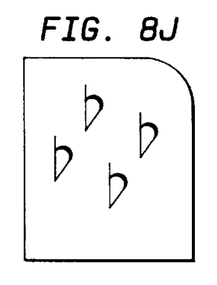

FIGS. 4 and 6 show additional nontransparent or transparent inscribable foils of different size and exhibiting two staffs indicia. FIG. 5 is a transparent foil as shown in FIG. 4, displaying musical notations of an exemplified melody.

A further enrichment of the apparatus is furnished by the nontransparent or in particular also transparent foils, as can be recognized from FIGS. 7 and 8. The notation foils are made of a transparent, nearly rigid or plastically easily deformable material designated in the context of this invention as foil material. These transparent foils can, for example, allow a recognition of various intervals A, B, C, D or various chords E, F, G, H or also various rhythms I or K. These notation foils are shown by way of example in FIGS. 7 and 8, with FIGS. 7A, 7B, 7C, 7D illustrating foils exhibiting different intervals, FIGS. 7E, 7F, 7G, 7H illustrating foils exhibiting different chords, and FIGS. 7I, 7K, 8.1 and 8.2 exhibiting different rhythms, FIGS. 8.3 to 8.6 exhibiting different sharp key signatures, and FIGS. 8.7 to 8.10 exhibiting different flat key signatures. The musical notation foils are generally of smaller size than the board 1 and can be selectively positioned and shifted on the work surface 2 in a desired manner.

The application possibilities of these foils are thereby not exhausted but in addition they can also be illustrated in an easily recognizable, memorable way—see FIG. 8—different rhythms 8.1 and 8.2 and the different key signatures, such as for example the sharp key signatures 8.3–8.6 or the different flat key signatures 8.7 to 8.10. In addition, the staff indicia means 3 of the transparent foils are in congruence with the staff indicia means on the work surface 2, such that upon placing of the foils these can be shifted in their pitch.

Therefore, these notation tables and foils can serve for the purpose of facilitating the learning of and the dealing with melodies, intervals, chords, rhythms, key signatures, transposing, and clefs.

Figure 9:
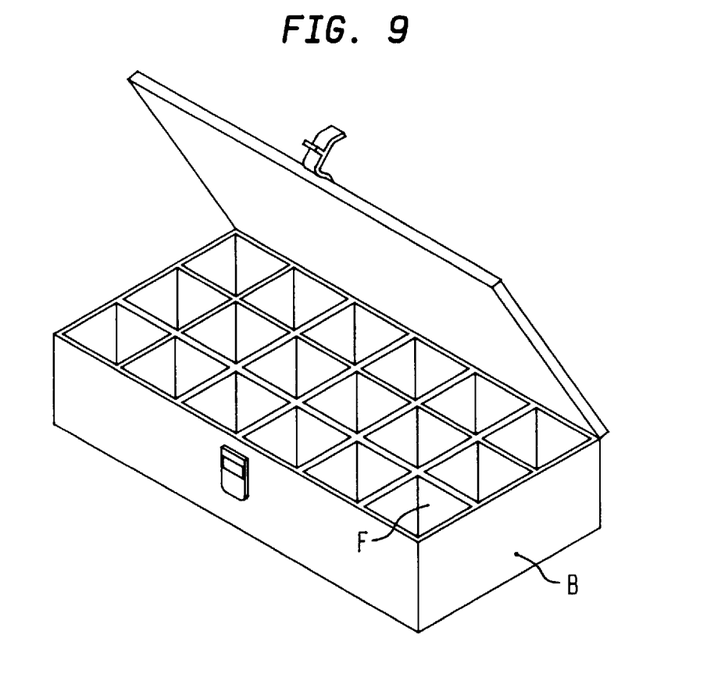
Figure 10:
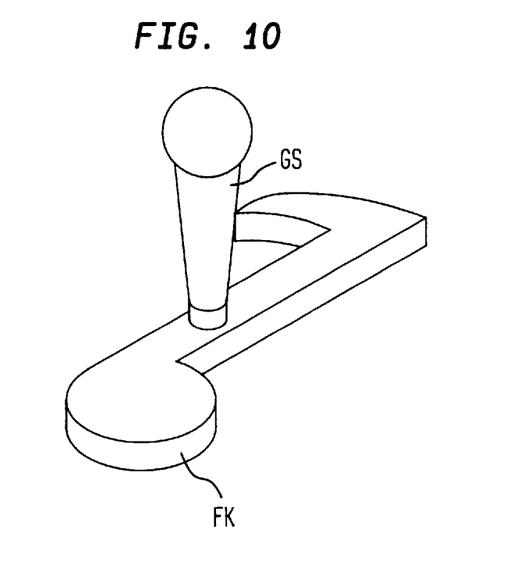
Figure 11:
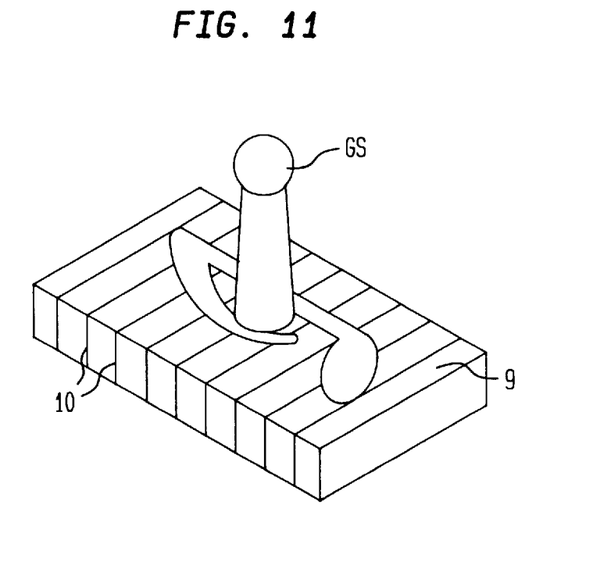
Figure 12:
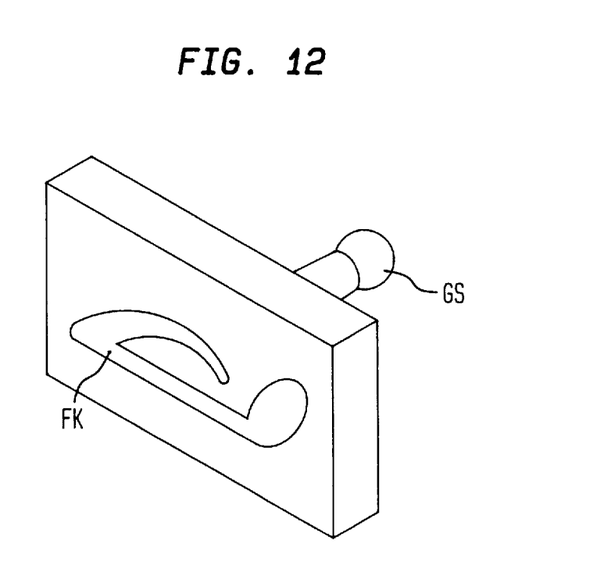
FIG. 12 is a bottom perspective representation of the indicia printing stamp of FIG. 11

The apparatus box B of the learning apparatus is shown in FIG. 9 with individual compartment F for the orderly receiving and removing of the form-parts FK These can be arranged according to the kind of musical symbols they embody and/or also according to their color configuration, in order to assure a quick and problem-free availability. FIG. 10 illustrates the music symbols in the shape of rubber stamps GS with a handle for easier handling. The printing blocks or stamps are designated in the context of the present invention as printing member. FIGS. 11 and 12 show a printing member for reproducing notation indicia, with the printing member having a marking plate 9 which includes a form-part FK and is connected to a handle GS. The marking plate 9 exhibits marking lines 10 and may receive a coloring agent for effecting a color contrast to the work surface 2 of the board 1 and the staff lines 4. The respective musical symbol can be pressed onto the board 1 or onto a foil placed on the board.

I claim:

1. A learning apparatus, comprising:

a planar multi-part foldable board having a work surface formed with a first adhering means and non-removable staff indicia thereon, with the staff indicia including staff lines;

at least one musical notation indicia printing stamp having a form-part configured in a shape of a musical notation and including second adhering means for coaction with the first adhering means to removably attach the form-part to the work surface; and at least one notation table displaying musical notations and including means for attaching the notation table to the board.

2. The learning apparatus of claim 1, and further comprising a covering plate for at least partially masking the work surface, said covering plate being formed with at least one cutout for visual recognition of one musical notation.

3. The learning apparatus of claim 1 wherein the notation table has reinforced edges.

4. The learning apparatus of claim 1 wherein the form-part has a back side exhibiting the second adhering means.

5. The learning apparatus of claim 1, and further comprising a notation foil defined by a size smaller than a size of the board, said notation foil being made of transparent, substantially rigid or plastically deformable material and being adapted for selective detachable securement to the work surface.

6. The learning apparatus of claim 1 wherein the work surface and the staff lines display a color which contrasts a color of the musical notations on the form-part.

7. The learning apparatus of claim 1 wherein staff lines on the board are spaced from one another at a greater distance than a distance of standard staff lines.

8. The learning apparatus of claim 7 wherein the staff lines on the board have a distance from each other ranging between 12 mm to 20 mm.

9. The learning apparatus of claim 1, and further comprising a box subdivided in a plurality of compartments for storing a plurality of such form parts.

10. The learning apparatus of claim 1 wherein the stamp is made of rubber.

11. The learning apparatus of claim 1 wherein the printing stamp includes a handle and a marking plate made of rubber and connected to the handle for reproducing musical notation indicia, said marking plate receiving a coloring agent and exhibiting marking lines.

* * * * *